(12) United States Patent
Ito et al.

(10) Patent No.: US 12,005,920 B2
(45) Date of Patent: Jun. 11, 2024

(54) CONTROL DEVICE, VEHICLE, MOBILE TERMINAL, AND DISPLAY DEVICE

(71) Applicant: TOYOTA JIDOSHA KABUSHIKI KAISHA, Toyota (JP)

(72) Inventors: Masaki Ito, Toyota (JP); Sui Kurihashi, Sunto-gun (JP); Hiroya Chiba, Fuji (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 15 days.

(21) Appl. No.: 17/947,484

(22) Filed: Sep. 19, 2022

(65) Prior Publication Data

US 2023/0141174 A1 May 11, 2023

(30) Foreign Application Priority Data

Nov. 10, 2021 (JP) ................. 2021-183706

(51) Int. Cl.
*B60W 50/14* (2020.01)
*B60W 40/10* (2012.01)
*B60W 40/12* (2012.01)
*G06F 3/14* (2006.01)
*G06V 20/58* (2022.01)

(52) U.S. Cl.
CPC ........ *B60W 50/14* (2013.01); *B60W 40/1005* (2013.01); *B60W 40/12* (2013.01); *G06F 3/14* (2013.01); *G06V 20/58* (2022.01); *B60W 2050/146* (2013.01); *B60W 2420/403* (2013.01)

(58) Field of Classification Search
CPC .. B60W 50/14; B60W 40/1005; B60W 40/12; B60W 2050/146; B60W 2420/403; B60W 2554/402; B60W 2554/4023; G06F 3/14; G06V 20/58; B60K 2360/174; B60K 2360/191; B60K 2360/566; B60K 35/00; B60K 35/22; B60K 35/28; B60K 35/29; B60K 35/80; G09G 3/002; G09G 2354/00; G09G 2380/10
See application file for complete search history.

(56) References Cited

U.S. PATENT DOCUMENTS

| 11,752,940 B2 | 9/2023 | Katagiri et al. |
| 2016/0259362 A1* | 9/2016 | Suzaki ................... B60K 26/04 |
| 2017/0243504 A1 | 8/2017 | Hada |

(Continued)

FOREIGN PATENT DOCUMENTS

| JP | 2009248865 A | 10/2009 |
| JP | 2020112698 A | 7/2020 |
| WO | 2017/046937 A1 | 3/2017 |

*Primary Examiner* — Xiao En Mo
(74) *Attorney, Agent, or Firm* — Oliff PLC

(57) ABSTRACT

A control device that executes display control to perform emphasis display of a preceding vehicle, includes a detection unit that detects a candidate vehicle for a following target from among a plurality of the preceding vehicles; a calculation unit that calculates, a reduction effect of energy consumption to be obtained when traveling following the candidate vehicle; and an emphasis display setting unit that performs setting for performing emphasis display of the candidate vehicle. Further, when the display control is executed, the emphasis display of the candidate vehicle is performed according to a degree of emphasis set by the emphasis display setting unit.

10 Claims, 6 Drawing Sheets

(56) References Cited

U.S. PATENT DOCUMENTS

2018/0286094 A1* 10/2018 Shishido ............... G06T 3/40
2023/0106909 A1* 4/2023 Ogata ............... G09G 3/002
                                                701/437

* cited by examiner

CONTROL DEVICE, VEHICLE, MOBILE TERMINAL, AND DISPLAY DEVICE

CROSS-REFERENCE TO RELATED APPLICATION(S)

The present application claims priority to and incorporates by reference the entire contents of Japanese Patent Application No. 2021-183706 filed in Japan on Nov. 10, 2021.

BACKGROUND

The present disclosure relates to a control device, a vehicle, a mobile terminal, and a display device.

WO 2017/046937 discloses that, regarding a display device that performs emphasis display of a preceding vehicle traveling in front of an own vehicle, when the emphasis display is set to the preceding vehicle, a degree of emphasis is made higher in a case where a distance between the preceding vehicle and the own vehicle is long than in a case where an inter-vehicle distance is short.

SUMMARY

There is a need for providing a control device, a vehicle, a mobile terminal, and a display device capable of displaying information regarding the preceding vehicle that enables following traveling that can reduce the energy consumption for a predetermined vehicle to the driver of the vehicle as visual information.

According to an embodiment, a control device that executes display control to perform emphasis display of a preceding vehicle traveling in front of a predetermined vehicle, includes: a detection unit that detects a candidate vehicle that is a candidate for a following target of the predetermined vehicle from among a plurality of the preceding vehicles; a calculation unit that calculates, for the candidate vehicle detected, a reduction effect of energy consumption to be obtained by the predetermined vehicle when traveling following the candidate vehicle; and an emphasis display setting unit that performs setting for performing emphasis display of the candidate vehicle for which the reduction effect has been calculated, and sets a degree of emphasis of the emphasis display to be higher for a vehicle with which the reduction effect is large than for a vehicle with which the reduction effect is small. Further, when the display control is executed, the emphasis display of the candidate vehicle is performed according to the degree of emphasis set by the emphasis display setting unit.

According to an embodiment, a display device that performs emphasis display of a preceding vehicle traveling in front of a predetermined vehicle, includes: a detection unit that detects a candidate vehicle that is a candidate for a following target of the predetermined vehicle from among a plurality of the preceding vehicles; a calculation unit that calculates, for the candidate vehicle detected, a reduction effect of energy consumption to be obtained by the predetermined vehicle when following the candidate vehicle; an emphasis display setting unit that performs setting for performing emphasis display of the candidate vehicle for which the reduction effect has been calculated, and sets a degree of emphasis of the emphasis display to be higher for a vehicle with which the reduction effect is large than for a vehicle with which the reduction effect is small; and a display unit that performs the emphasis display of the candidate vehicle according to the degree of emphasis set by the emphasis display setting unit.

DETAILED DESCRIPTION

In the related art, there is a case where the driver of a vehicle desires following traveling that can reduce energy consumption of the own vehicle. In this case, it is difficult for the driver to determine which vehicle should be followed. Thus, there is room for study on a technique for visually presenting information regarding a vehicle that is a candidate for a following target to the driver.

Hereinafter, a control device, a vehicle, a mobile terminal, and a display device, according to embodiments of the present disclosure will be specifically described with reference to the drawings. Note that the present disclosure is not limited to the embodiments described below.

First Embodiment

The vehicle 1 of the first embodiment is configured to perform emphasis display of a preceding vehicle to be followed among preceding vehicles traveling in front of the own vehicle. The vehicle 1 is equipped with a system that travels following a preceding vehicle traveling in front of the own vehicle, such as automatic cruise control or adaptive cruise control, for example. Note that "own vehicle" described here means the "vehicle 1".

For example, the vehicle 1 is a battery electric vehicle (BEV) equipped with a motor as a motive power source for traveling. In the vehicle 1, the motor is driven by supplying electric power stored in a battery to the motor, and motive power output from the motor is transmitted to drive wheels via a power transmission device. That is, since the vehicle 1 travels by the motive power obtained by consuming the electric power, the electric cost is improved and the cruise distance can be extended in a traveling state with good energy efficiency.

Figure 1:
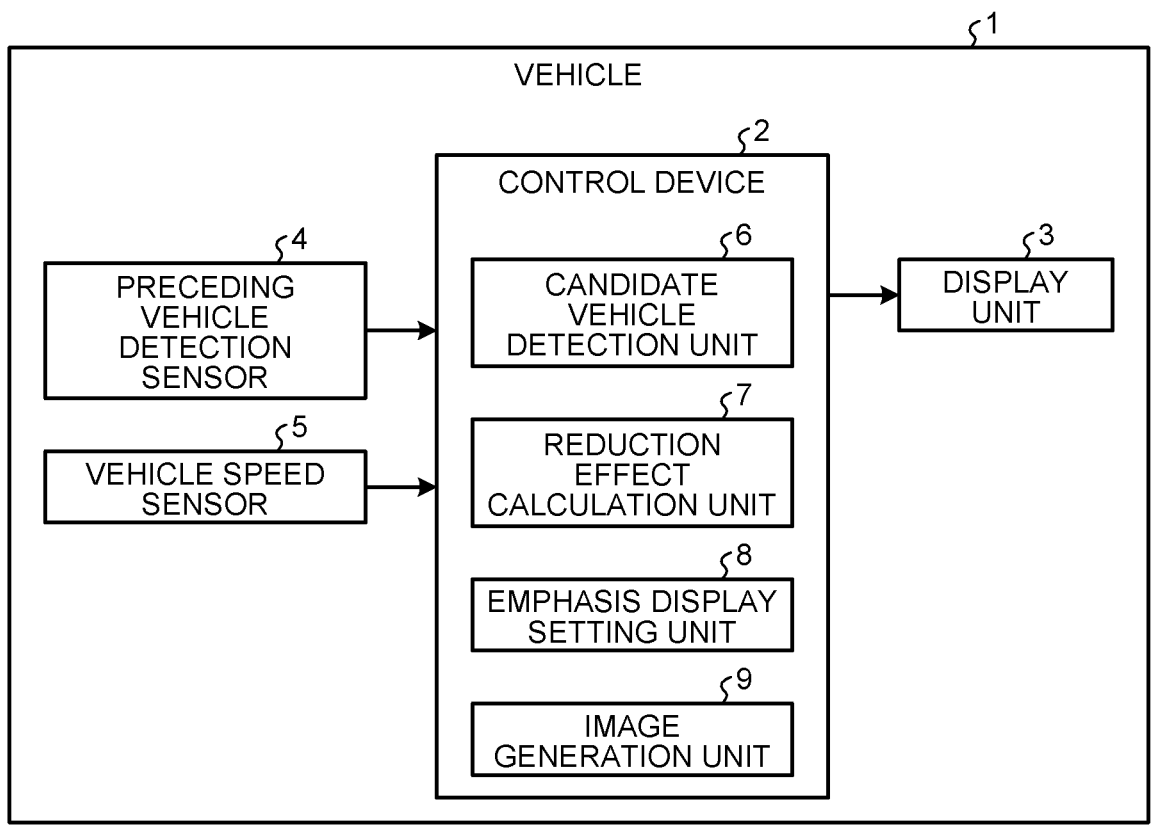
FIG. 1 is a block diagram schematically illustrating a vehicle according to a first embodiment.

As illustrated in FIG. 1, the vehicle 1 includes a control device 2 and a display unit 3. That is, the vehicle 1 is equipped with a display device including the control device 2 and the display unit 3. This display device is a device that performs the emphasis display of a vehicle to be followed among preceding vehicles traveling in front of the own vehicle.

The control device 2 includes an electronic control device, and executes display control to display information regarding a preceding vehicle traveling in front of the own vehicle on the display unit 3. The control device 2 includes a microcomputer including a CPU, a RAM, a ROM, and an input/output interface. The control device 2 performs signal processing according to a program stored in advance in the ROM. Further, signals from various sensors mounted on the vehicle 1 are input to the control device 2. For example, signals from a preceding vehicle detection sensor 4 that detects a preceding vehicle traveling in front of the own vehicle, a vehicle speed sensor 5 that detects a vehicle speed of the own vehicle, and the like are input to the control device 2.

The preceding vehicle detection sensor 4 is a sensor for detecting a preceding vehicle, and includes, for example, a front camera, a millimeter wave radar, or the like. In the first embodiment, the preceding vehicle detection sensor 4 includes a front camera and a millimeter wave radar. Thus, the preceding vehicle detection sensor 4 outputs preceding vehicle information including an image of the front camera and a measurement result of the millimeter wave radar to the control device 2. Further, the vehicle speed sensor 5 detects the vehicle speed of the vehicle 1 from a pulse signal corresponding to the rotation speed of an axle. Since the control device 2 includes the input/output interface, it is possible to transmit and receive information necessary for controlling the emphasis display, such as receiving signals from the preceding vehicle detection sensor 4 and the vehicle speed sensor 5.

Then, the control device 2 executes display control to perform the emphasis display of a preceding vehicle traveling in front of the own vehicle on the basis of signals input from the preceding vehicle detection sensor 4 and the vehicle speed sensor 5. At that time, an image of the emphasis display is output from the control device 2 to the display unit 3. As described above, the control device 2 is a control unit that executes control of the emphasis display, and outputs the image of the emphasis display to the display unit 3.

More specifically, as illustrated in FIG. 1, the control device 2 includes a candidate vehicle detection unit 6, a reduction effect calculation unit 7, an emphasis display setting unit 8, and an image generation unit 9.

The candidate vehicle detection unit 6 detects a vehicle (candidate vehicle) that is a candidate for a following target of the own vehicle among the preceding vehicles traveling in front of the own vehicle. The candidate vehicle detection unit 6 acquires the preceding vehicle information from the preceding vehicle detection sensor 4, and detects a candidate vehicle on the basis of the preceding vehicle information. Since the preceding vehicle information includes the image ahead of the own vehicle and the measurement result by the radar, the candidate vehicle detection unit 6 detects the preceding vehicle to be followed on the basis of the image ahead of the own vehicle and the measurement result of the millimeter wave radar.

The reduction effect calculation unit 7 calculates a reduction effect of energy consumption obtained when the vehicle travels following the candidate vehicle as a following target. The reduction effect calculation unit 7 calculates the reduction effect of energy consumption for each candidate vehicle detected by the candidate vehicle detection unit 6. Further, since the vehicle 1 is a battery electric vehicle, the reduction effect calculation unit 7 calculates a reduction effect of electric power consumed during following traveling. That is, the reduction effect calculation unit 7 calculates a reduction effect of electricity cost.

Specifically, the reduction effect calculation unit 7 calculates a reduction effect of air resistance by the following traveling as the reduction effect of electricity cost. This air resistance can be calculated on the basis of a vehicle body rating of the candidate vehicle, a distance (inter-vehicle distance) between the own vehicle and the candidate vehicle, and the vehicle speed of the own vehicle. The vehicle body rating of the candidate vehicle and the inter-vehicle distance from the candidate vehicle can be calculated on the basis of the preceding vehicle information acquired by the preceding vehicle detection sensor 4. The vehicle speed of the own vehicle can be detected by the vehicle speed sensor 5. For example, the reduction effect calculation unit 7 analyzes the image of the front of the own vehicle acquired by the front camera included in the preceding vehicle detection sensor 4, calculates the vehicle body rating of the candidate vehicle, and calculates the inter-vehicle distance between the own vehicle and the candidate vehicle. Alternatively, the reduction effect calculation unit 7 calculates the inter-vehicle distance between the candidate vehicle and the own vehicle on the basis of the measurement result of the radar acquired by the millimeter wave radar included in the preceding vehicle detection sensor 4. Then, the reduction effect calculation unit 7 calculates the reduction effect of the air resistance on the basis of the vehicle body rating, the inter-vehicle distance, and the vehicle speed of the candidate vehicle. As an example, in a case where the vehicle body rating of the candidate vehicle is large, the reduction effect of the air resistance becomes large, and in a case where the vehicle body rating of the candidate vehicle is small, the reduction effect of the air resistance becomes small. The reduction effect calculation unit 7 calculates the reduction effect thus calculated for each of the plurality of candidate vehicles detected by the candidate vehicle detection unit 6.

The emphasis display setting unit 8 sets the degree of emphasis according to the reduction effect of the energy consumption. The emphasis display setting unit 8 sets the degree of emphasis of the emphasis display to be higher for a vehicle with which the reduction effect of the energy consumption is large than for a vehicle with which the reduction effect of the energy consumption is small. For example, it is possible to relatively make a difference in the degree of emphasis by first setting the degree of emphasis to be a reference and then increasing the degree of emphasis of emphasis display for the candidate vehicle with which the reduction effect of the energy consumption is large.

Specifically, the emphasis display setting unit 8 first sets a display position and a display size of an image displayed as emphasis display. The display position of the image is set behind the candidate vehicle. The image of the emphasis display is a following mark for emphasis display of the candidate vehicle to be followed. Then, the emphasis display setting unit 8 changes the degree of emphasis of the emphasis display according to the reduction effect of the energy consumption. For a candidate vehicle with which the reduction effect of the energy consumption is large, the display size is changed to be larger. On the other hand, for a candidate vehicle with which the reduction effect of the energy consumption is small, the display size set to a reference value is not changed. Thus, the size of an image to be emphasis-displayed becomes relatively large, and the degree of emphasis becomes high. Further, as the reduction effect of the energy consumption increases, it is also possible to increase the degree of emphasis by increasing the size of the image of the emphasis display.

The image generation unit 9 generates an image for the emphasis display of the candidate vehicle. The image generation unit 9 generates the image of the emphasis display according to the degree of emphasis set by the emphasis display setting unit 8. Then, information of the image of the emphasis display generated by the image generation unit 9 is output to the display unit 3.

The display unit 3 is a display that is provided at a position in the vehicle cabin where a driver who is driving the vehicle 1 can visually recognize, and displays an image. For example, the display unit 3 includes a car navigation device, a multi-information display, or a head-up display. That is, the display unit 3 includes a human machine interface (HMI) mounted on the vehicle 1. Further, the display unit 3 is controlled by the control device 2, and displays an image according to a signal input from the control device 2. When the display device displays information regarding the candidate vehicle as a following target, the image of the emphasis display output from the image generation unit 9 is displayed on the display unit 3.

The control device 2 configured as described above performs the emphasis display of a candidate vehicle that is a candidate for a following target among vehicles traveling around the vehicle 1. At that time, it is possible to make a difference in the degree of emphasis of the emphasis display according to the magnitude of the reduction effect of the energy consumption obtained by the own vehicle during the following traveling. For example, the control device 2 changes the size of the emphasis display as the degree of emphasis of the emphasis display. An example of the emphasis display displayed on the display unit 3 is illustrated in FIG. 2.

Figure 2:
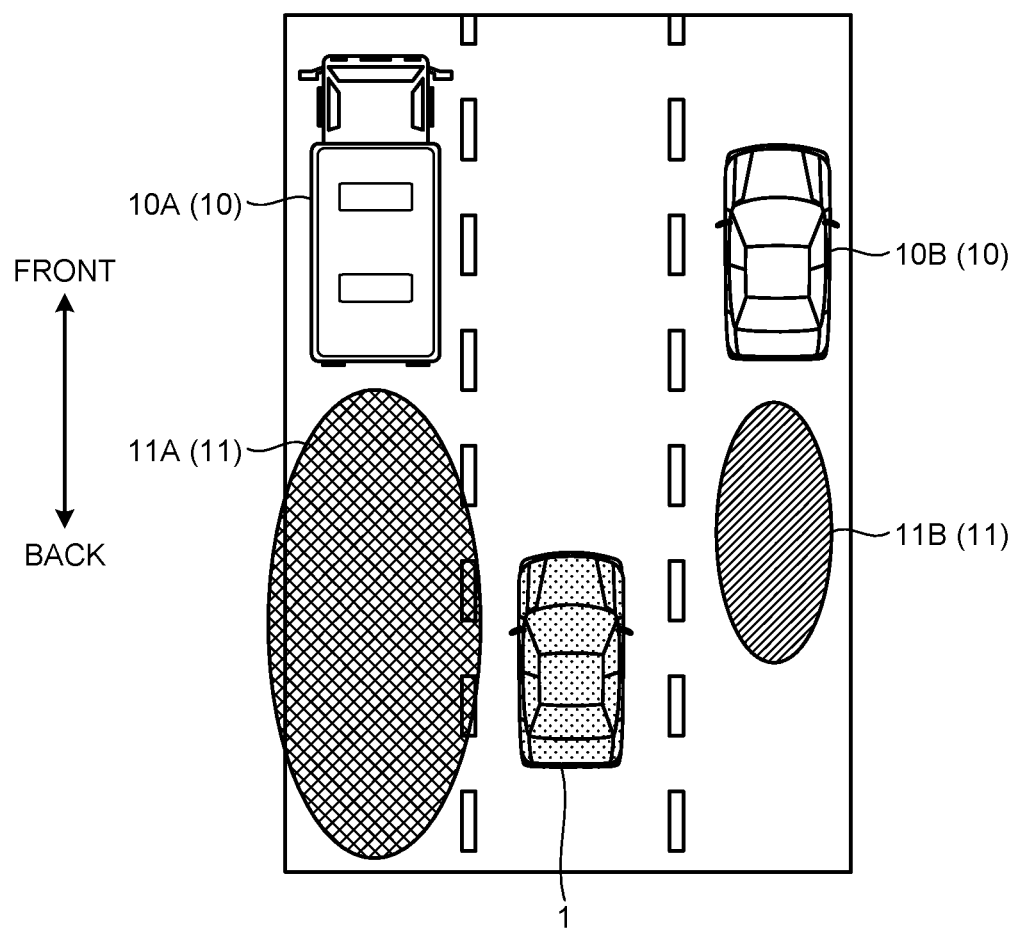
FIG. 2 is a diagram for describing emphasis display.

FIG. 2 illustrates an image displayed on the display unit 3 in a case where two candidate vehicles 10 are traveling in front of the own vehicle while the vehicle 1 is traveling on a road having a plurality of lanes. The control device 2 displays a following mark 11 as the emphasis display for each candidate vehicle 10, and displays the following mark 11 with a difference in the degree of emphasis. In the example illustrated in FIG. 2, the vehicle body rating of a first candidate vehicle 10A is larger than the vehicle body rating of a second candidate vehicle 10B. Thus, the first candidate vehicle 10A has a higher reduction effect of the energy consumption obtained when performing following traveling than the second candidate vehicle 10B. Accordingly, the control device 2 sets the degree of emphasis of a following mark 11A for the first candidate vehicle 10A to be higher than the degree of emphasis of a following mark 11B for the second candidate vehicle 10B. Specifically, the following mark 11A to be emphasis-displayed behind the first candidate vehicle 10A is made larger than the following mark 11B for the second candidate vehicle 10B. Consequently, the following mark 11A of the first candidate vehicle 10A is displayed larger than the following mark 11B of the second candidate vehicle 10B. In this manner, by simultaneously displaying the emphasis display for the plurality of candidate vehicles 10 and making a difference in the degree of emphasis of the emphasis display, the following marks can be decision materials when the driver decides which vehicle should be set as the following target.

Figure 3:
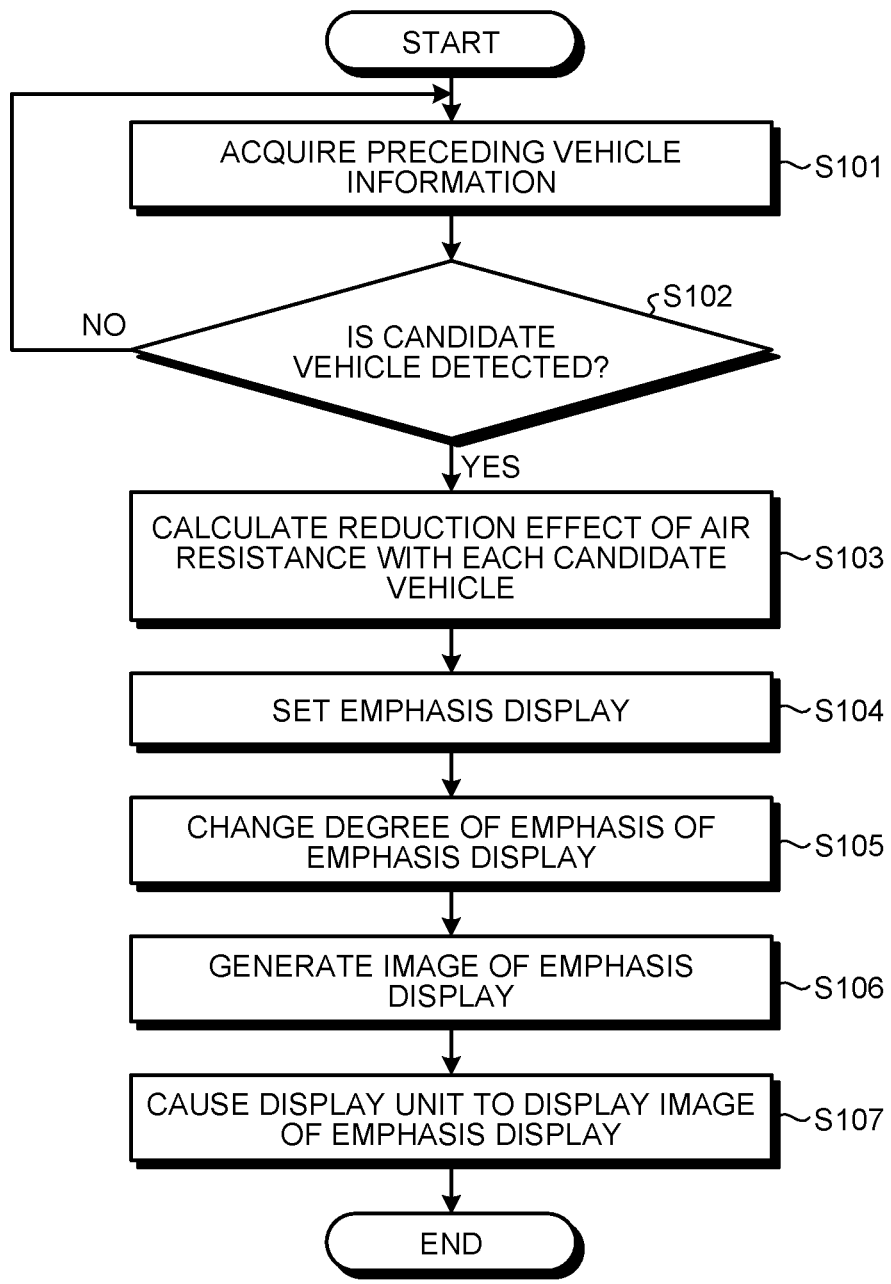
FIG. 3 is a flowchart illustrating an emphasis display processing flow.

FIG. 3 is a flowchart illustrating an emphasis display processing flow. Note that control illustrated in FIG. 3 is repeatedly executed by the control device 2 while the vehicle 1 is traveling.

The control device 2 acquires preceding vehicle information from the preceding vehicle detection sensor 4 (Step S101). In Step S101, the image of the front camera and the measurement result of the radar included in the preceding vehicle information are acquired on the basis of the signal input to the input/output interface of the control device 2.

The control device 2 determines whether or not the candidate vehicle 10 as the following target of the own vehicle is detected among the preceding vehicles traveling in front of the own vehicle (Step S102). In Step S102, the candidate vehicle detection unit 6 analyzes the image of the front camera to determine whether or not the candidate vehicle 10 as the following target is detected among the preceding vehicles traveling in front of the own vehicle.

In a case where the candidate vehicle 10 is not detected (Step S102: No), this control routine returns to Step S101.

In a case where the candidate vehicle 10 is detected (Step S102: Yes), the control device 2 calculates the reduction effect of the air resistance to be obtained when following the detected candidate vehicle 10 (Step S103). In Step S103, in a case where the plurality of candidate vehicles 10 is detected in Step S102, the reduction effect of the air resistance to be obtained when traveling following each of the plurality of candidate vehicles 10 is calculated. In Step S103, the reduction effect calculation unit 7 calculates the reduction effect of the air resistance with each candidate vehicle 10.

The control device 2 sets the emphasis display to be displayed on the candidate vehicle 10 (Step S104). In Step S104, the display position and the display size of the following mark 11 as the emphasis display are set for each candidate vehicle 10. The display position is set at the rear position of each candidate vehicle 10 in the display area of the display unit 3. The display size is set to a predetermined reference value. That is, in Step S104, the size of the display size is set as the reference value as the degree of emphasis of the emphasis display.

For example, the reference value is a value preset by the driver. As an example, in a case where the emphasis display can be arbitrarily set from three levels such as "strong, medium, and weak", the reference value of the display size can be set according to the level selected by the driver. The reference value of the display size set in a case where the level is "strong" is a value larger than the reference value set in a case where the level is "medium". The reference value of the display size set in a case where the level is "weak" is a value smaller than the reference value set in a case where the level is "medium".

Further, the control device 2 changes the degree of emphasis of the emphasis display on the basis of the magnitude of the reduction effect of the air resistance (Step S105). In Step S105, the degree of emphasis of the emphasis display is changed such that the degree of emphasis of the emphasis display for the candidate vehicle 10 for which the reduction effect of the air resistance is calculated to be large is higher than the degree of emphasis of the emphasis display for the candidate vehicle 10 for which the reduction effect of the air resistance is calculated to be small. In Step S105, the emphasis display setting unit 8 compares the magnitude of the reduction effect of air resistance with respect to the plurality of candidate vehicles 10, specifies the candidate vehicle 10 with which the reduction effect is relatively large, and increases the degree of emphasis for the candidate vehicle 10. That is, in Step S105, for the candidate vehicle 10 with which the reduction effect of the air resistance is relatively large, the degree of emphasis of the emphasis display set in Step S104 is changed to be higher than the reference value of the degree of emphasis of the emphasis display.

Then, the control device 2 generates the image of the emphasis display to be displayed on the candidate vehicle 10 (Step S106). In Step S106, the image of the emphasis display for each candidate vehicle 10 is generated on the basis of the display position, the display size, and the change in the degree of emphasis set in the processing in Steps S104 and S105.

The control device 2 causes the display unit 3 to display the generated image of the emphasis display (Step S107). In Step S107, image data is output from the control device 2 to the display unit 3, and the image of the emphasis display is displayed on the display unit 3. When the processing of Step S107 is performed, this control routine ends.

As described above, in a case where the reduction effect of the energy consumption is large by the processing in Step S105, the degree of emphasis of the emphasis display can be set to be higher. That is, for the candidate vehicle 10 for which the reduction effect of the air resistance is calculated to be relatively small, the degree of emphasis is not changed in Step S105, and the image of the emphasis display is generated with the degree of emphasis of the emphasis display set in Step S104. Thus, as illustrated in FIG. 2, the degree of emphasis of the emphasis display for one candidate vehicle 10 can be increased with respect to the two candidate vehicles 10. Consequently, the driver of the vehicle 1 can easily determine which vehicle is desirable to follow by checking the image of the display unit 3 during driving.

As described above, according to the first embodiment, among the plurality of candidate vehicles 10 that are candidates for the following target, the candidate vehicle 10 with which the reduction effect of the energy consumption is large is emphasis-displayed by an image having a high degree of emphasis. Thus, the display is visually easy to understand for the driver of the vehicle 1. Consequently, when the driver of the vehicle 1 desires following traveling, it can be expected that the frequency of following the candidate vehicle 10 with which the reduction effect of the energy consumption is large increases.

Note that the vehicle 1 is not limited to the battery electric vehicle, and may be a vehicle on which only an engine is mounted as a motive power source or a hybrid electric vehicle (HEV) on which an engine and a motor are mounted as motive power sources. That is, the reduction effect calculation unit 7 can calculate not only the reduction effect of electricity cost of the vehicle 1 but also the reduction effect of the air resistance of the vehicle 1. That is, the energy consumption described here includes at least one of electric power consumption or fuel consumption.

Further, the case where the preceding vehicle detection sensor 4 includes both the front camera and the millimeter wave radar has been described, but the preceding vehicle detection sensor 4 is not limited thereto. The preceding vehicle detection sensor 4 may include only one of the front camera or the millimeter wave radar. For example, in a case where the preceding vehicle detection sensor 4 includes only the front camera, the control device 2 can calculate the inter-vehicle distance between the own vehicle and the candidate vehicle 10 by analyzing the front image included in the preceding vehicle information. Alternatively, in a case where the preceding vehicle detection sensor 4 includes only the millimeter wave radar, the control device 2 can calculate the vehicle body rating of the candidate vehicle 10 on the basis of the measurement result of the radar included in the preceding vehicle information.

Figure 4:
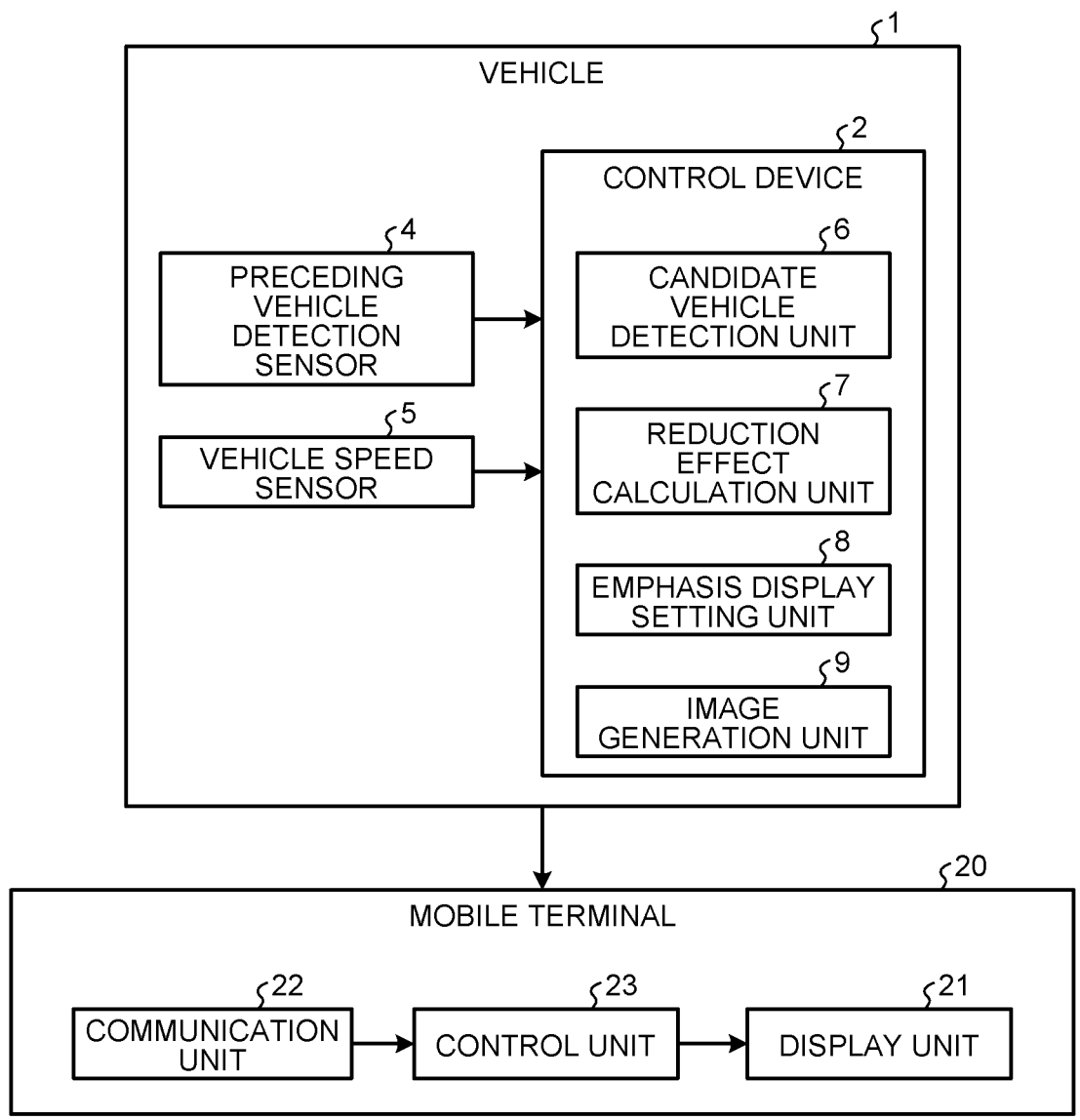
FIG. 4 is a block diagram for explaining a configuration of a second embodiment.

Further, the case where the control device 2 sets the reference value of the degree of emphasis according to the level set by the driver in Step S104 illustrated in FIG. 4 has been described, but the present disclosure is not limited thereto. That is, the control device 2 can set the emphasis display regardless of the presence or absence of the setting in advance by the driver. For example, in Step S104, the display size can be uniformly set for each candidate vehicle 10.

Further, the example in which the degree of emphasis of the candidate vehicle 10 with which the reduction effect of the air resistance is large is changed to be higher in Step S105 illustrated in FIG. 4 has been described, but the present disclosure is not limited thereto. The emphasis display setting unit 8 may change the degree of emphasis of the candidate vehicle 10 with which the reduction effect of the air resistance is small to be lower. In this case, the degree of emphasis of the candidate vehicle 10 with which the reduction effect of the air resistance is large does not need to be changed or may be changed to be higher. In short, the emphasis display setting unit 8 only needs to be capable of changing the degree of emphasis so that the degree of emphasis of the candidate vehicle 10 with which the reduction effect of the air resistance is large relatively higher than the degree of emphasis of the candidate vehicle 10 with which the reduction effect of the air resistance is small.

Further, the number of candidate vehicles 10 is not limited to a plurality, and may be one. That is, even in a case where there is one candidate vehicle 10 detected by the candidate vehicle detection unit 6, the emphasis display setting unit 8 can add intensity to the degree of emphasis of the emphasis display for the candidate vehicle 10. For example, the emphasis display setting unit 8 determines the magnitude of the reduction effect according to the vehicle speed of the own vehicle. When the vehicle speed is high, air resistance acting on the vehicle 1 increases. Thus, the emphasis display setting unit 8 determines that the reduction effect of the air resistance obtained by the following traveling is large in a case where the vehicle speed is high, and determines that the reduction effect of the air resistance obtained by the following traveling is small in a case where the vehicle speed is low. In a case where it is determined that the reduction effect of the air resistance by the following traveling is large due to the high vehicle speed, the emphasis display setting unit 8 changes the degree of emphasis of the emphasis display for the candidate vehicle 10 to be higher than the reference value in Step S105.

Further, the degree of emphasis of the emphasis display is not limited to the size of the image. In short, the degree of emphasis can be expressed by size, color, shape, transmittance, blinking, and the like. For example, in a case where the degree of emphasis is represented by color, the emphasis display setting unit 8 changes the following mark 11 to a color different from those of other vehicles for the candidate vehicle 10 with which the reduction effect of the energy consumption is relatively large. Further, in a case where the degree of emphasis is expressed by a form, the emphasis display setting unit 8 changes the following mark 11 to a shape different from those of other vehicles for the candidate vehicle 10 with which the reduction effect of the energy consumption is relatively large. Furthermore, in a case where the degree of emphasis is represented by transparency, the emphasis display setting unit 8 changes the transparency of the following mark 11 so that, for the candidate vehicle 10 with which the reduction effect of the energy consumption is relatively large, it becomes a darker image than those for other vehicles. Further, in a case where the degree of emphasis is represented by blinking, the emphasis display setting unit 8 makes a change such that, for the candidate vehicle 10 with which the reduction effect of the energy consumption is relatively large, the following mark 11 is displayed in a blinking manner unlike other vehicles.

Second Embodiment

Next, a second embodiment will be described. In the second embodiment, the display unit includes a display of a mobile terminal owned by an occupant. Note that, in the description of the second embodiment, the description of components similar to those of the first embodiment will be omitted, and their reference numerals will be cited.

FIG. 4 is a block diagram for describing a configuration of a second embodiment. In the second embodiment, the image of the emphasis display generated by the control device 2 of the vehicle 1 is displayed on a display unit 21 of a mobile terminal 20. The display device of the second embodiment includes the control device 2 on the vehicle side and the display unit 21 on the mobile terminal side. The vehicle 1 and the mobile terminal 20 are communicably connected.

The vehicle 1 includes the control device 2, the preceding vehicle detection sensor 4, and the vehicle speed sensor 5. The control device 2 includes a communication unit that transmits and receives information to and from the mobile terminal 20. The communication unit transmits image data of the emphasis display generated by the image generation unit 9 to the mobile terminal 20.

The mobile terminal 20 includes a mobile terminal such as a smartphone carried by an occupant of the vehicle 1. The mobile terminal 20 includes the display unit 21, a communication unit 22, and a control unit 23.

The display unit 21 is a display of the mobile terminal 20. The display unit 21 displays the image data of the emphasis display input from the vehicle 1.

The communication unit 22 communicates with the vehicle 1 and receives the image data of the emphasis display transmitted from the vehicle 1. The mobile terminal 20 may transmit and receive information in a state of being connected to the vehicle 1 by wire, or may transmit and receive information by performing wireless communication in a state of being connected wirelessly. Further, the method of wireless communication is not particularly limited as to whether it is short-distance communication or long-distance communication.

The control unit 23 is a control unit that controls the display unit 21, and causes the display unit 21 to display the image data of the emphasis display acquired by the communication unit 22. The control unit 23 includes a microcomputer including a CPU, a RAM, a ROM, and an input/output interface. In the second embodiment, the control device of the display device may include the control unit 23.

In the second embodiment configured as described above, while the vehicle 1 is traveling, emphasis display control is executed in a state where the display unit 21 of the mobile terminal 20 is disposed at a position visually recognizable by the driver of the vehicle 1. The flow of this control is illustrated in FIG. 5.

Figure 5:
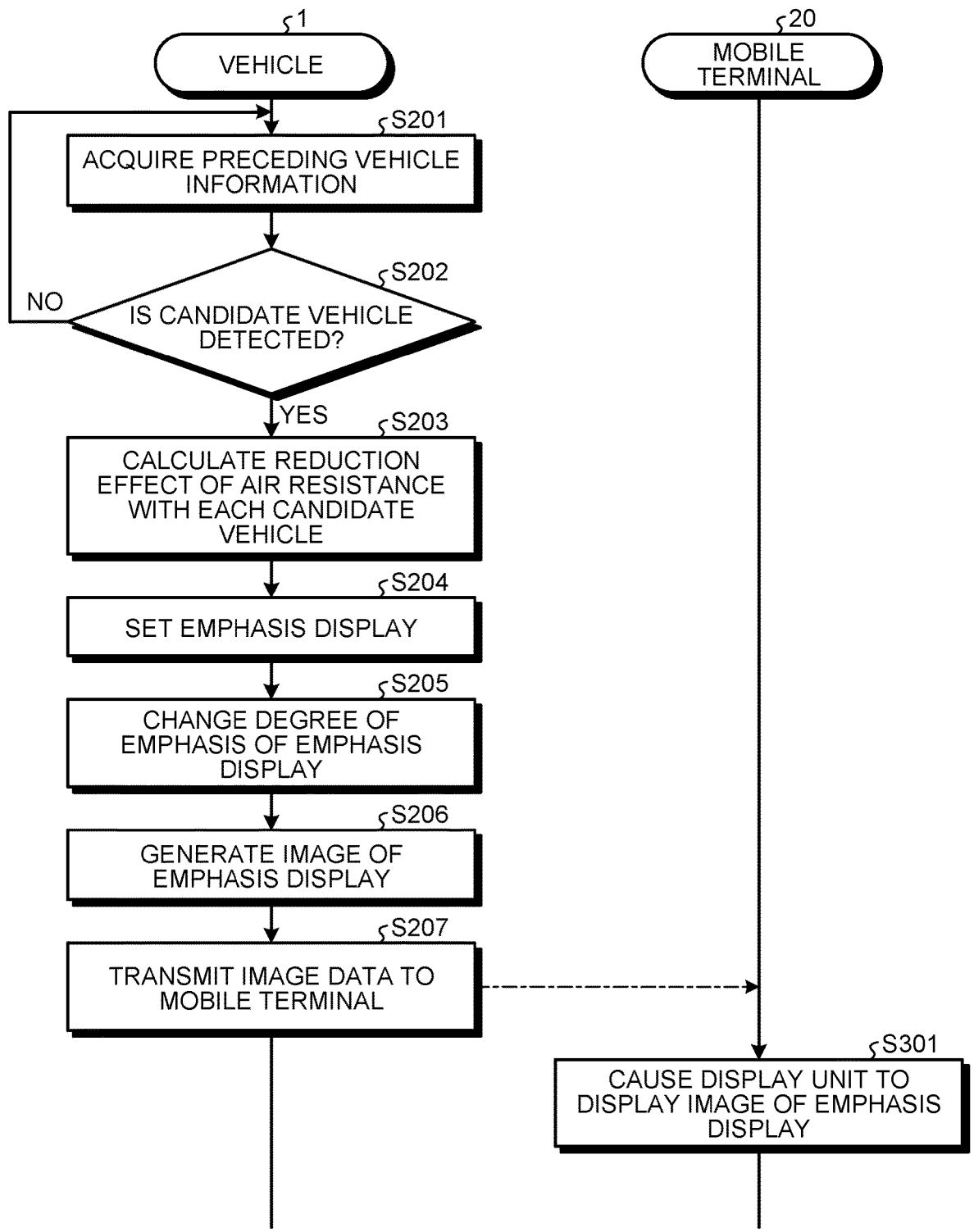
FIG. 5 is a sequence diagram for explaining control of the second embodiment.

FIG. 5 is a sequence diagram for explaining control of the second embodiment. Note that Steps S201 to S206 illustrated in FIG. 5 are similar to Steps S101 to S106 illustrated in FIG. 3, and thus the description thereof is omitted.

As illustrated in FIG. 5, the control device 2 of the vehicle 1 transmits the image data of emphasis display generated by the processing in Step S206 to the mobile terminal 20 (Step S207). In Step S207, the image data is transmitted to the mobile terminal 20 brought into the vehicle cabin of the vehicle 1. The control device 2 transmits the image data of emphasis display to the mobile terminal 20 in a state where the front of the vehicle 1 is imaged by the camera of the mobile terminal 20, for example.

Upon receiving the image data of emphasis display transmitted from the vehicle 1, the mobile terminal 20 displays the image of the emphasis display on the display unit 21 (Step S301). In Step S301, the image of the emphasis display is displayed on the display unit 21 under the control of the control unit 23.

According to the second embodiment, in the display device including the control device 2 of the vehicle 1 and the display unit 21 of the mobile terminal 20, the emphasis display of the candidate vehicle 10 can be performed on the mobile terminal 20 brought into the vehicle cabin of the vehicle 1. Since the display unit of the display device is not limited to an onboard device, the application range of the display device is widened.

Third Embodiment

Next, a third embodiment will be described. In the third embodiment, all the functions for emphasis display provided in the vehicle 1 in the first embodiment are provided in a mobile terminal brought into the vehicle cabin of the vehicle 1. Note that, in the description of the third embodiment, the description of components similar to those of the first embodiment and the second embodiment will be omitted, and their reference numerals will be cited.

Figure 6:
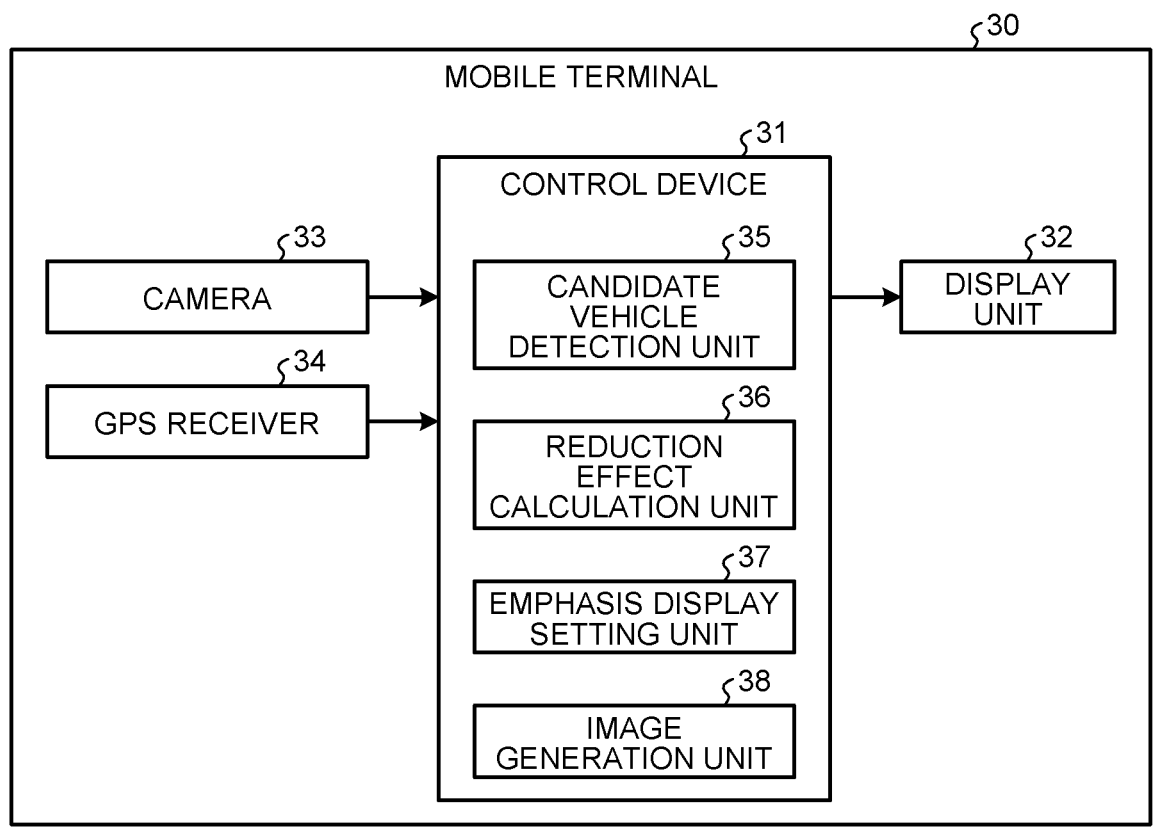
FIG. 6 is a block diagram for explaining a configuration of a third embodiment.

FIG. 6 is a block diagram for describing a configuration of a third embodiment. In the third embodiment, a mobile terminal 30 brought into the vehicle cabin of the vehicle 1 detects the candidate vehicle 10 and performs the emphasis display of the candidate vehicle 10. The mobile terminal 30 includes a control device 31, a display unit 32, a camera 33, and a GPS receiver 34.

The control device 31 includes an electronic control device, and has a hardware configuration similar to that of the control device 2 of the first embodiment. The control device 31 sets the vehicle 1 into which the mobile terminal 30 is brought as an own vehicle, and executes display control to display information regarding a preceding vehicle traveling in front of the own vehicle on the display unit 32.

Further, signals from various sensors provided in the mobile terminal 30 are input to the control device 31. For example, signals from the camera 33 and the GPS receiver 34 are input to the control device 31.

The camera 33 is a camera mounted on the mobile terminal 30, and functions as a sensor for detecting the preceding vehicle traveling in front of the own vehicle in a state where the mobile terminal 30 is brought into the vehicle 1. The mobile terminal 30 is disposed at a position and in a direction such that the camera 33 images the front of the own vehicle from the vehicle cabin of the vehicle 1. Further, the camera 33 outputs preceding vehicle information including an image as a front camera to the control device 31.

The GPS receiver 34 receives a signal from a GPS satellite, and functions as a vehicle speed sensor that detects the vehicle speed of the own vehicle in a state where the mobile terminal 30 is brought into the vehicle 1. The position information acquired by the GPS receiver 34 is output to the control device 31. Since the mobile terminal 30 can acquire its own position information by the GPS receiver 34, the control device 31 can calculate its own moving speed, that is, the vehicle speed of the vehicle 1 on the basis of the position information.

Then, the control device 31 executes display control to perform the emphasis display of the preceding vehicle traveling in front of the own vehicle on the basis of signals input from the camera 33 and the GPS receiver 34 for the own vehicle into which the mobile terminal 30 is brought. At that time, the image of the emphasis display is output from the control device 31 to the display unit 32.

More specifically, as illustrated in FIG. 6, the control device 31 includes a candidate vehicle detection unit 35, a reduction effect calculation unit 36, an emphasis display setting unit 37, and an image generation unit 38. Note that the candidate vehicle detection unit 35, the reduction effect calculation unit 36, the emphasis display setting unit 37, and the image generation unit 38 are functionally similar to the candidate vehicle detection unit 6, the reduction effect calculation unit 7, the emphasis display setting unit 8, and the image generation unit 9 in the first embodiment.

The candidate vehicle detection unit 35 detects the candidate vehicle 10 traveling in front of the own vehicle by analyzing the image of the front of the own vehicle input from the camera 33.

The reduction effect calculation unit 36 calculates the vehicle body rating and the inter-vehicle distance of the candidate vehicle 10 on the basis of the preceding vehicle information acquired from the camera 33, and calculates the vehicle speed of the own vehicle on the basis of the position information acquired from the GPS receiver 34. Then, the reduction effect calculation unit 36 calculates the reduction effect of air resistance.

The emphasis display setting unit 37 sets the degree of emphasis of the emphasis display on the basis of the reduction effect of the air resistance calculated by the reduction effect calculation unit 36.

The image generation unit 38 generates an image of the emphasis display according to the degree of emphasis of the emphasis display set by the emphasis display setting unit 37. The image of the emphasis display generated by the image generation unit 38 is output to the display unit 32.

The display unit 32 is a display of the mobile terminal 20. The display unit 32 displays the image of the emphasis display generated by the image generation unit 38.

According to the third embodiment, it is possible to perform the emphasis display of the candidate vehicle 10 traveling in front of the own vehicle by using the mobile terminal 30 brought into the vehicle cabin of the vehicle 1.

In the present disclosure, information regarding the preceding vehicle that enables following traveling that can reduce the energy consumption for the predetermined vehicle can be presented to the driver of the vehicle as visual information in an emphasis-displayed state.

According to an embodiment, information regarding the preceding vehicle that enables following traveling that can reduce the energy consumption for the predetermined vehicle can be presented to the driver of the vehicle as visual information in an emphasis-displayed state.

According to an embodiment, it is possible to perform the emphasis display of the following target with which the reduction effect of the energy consumption is large among a plurality of preceding vehicles.

According to an embodiment, it is possible to perform the emphasis display of the candidate vehicle with which the reduction effect of the air resistance is large.

According to an embodiment, information regarding the preceding vehicle that enables following traveling that can reduce the energy consumption for the predetermined vehicle can be presented to the driver of the vehicle as visual information in an emphasis-displayed state.

According to an embodiment, it is possible to perform the emphasis display of the following target with which the reduction effect of the energy consumption is large among a plurality of preceding vehicles.

According to an embodiment, it is possible to perform the emphasis display of the candidate vehicle with which the reduction effect of the air resistance is large.

According to an embodiment, information regarding the preceding vehicle that enables following traveling that can reduce the energy consumption for the predetermined vehicle can be displayed as visual information in an emphasis-displayed state on the display unit of the mobile terminal, and presented to the driver of the vehicle.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device that executes display control to perform emphasis display of a preceding vehicle traveling in front of a predetermined vehicle, the control device comprising:
    a detection unit that detects a candidate vehicle that is a candidate for a following target of the predetermined vehicle from among a plurality of the preceding vehicles;
    a calculation unit that calculates, for the candidate vehicle detected, a reduction effect of energy consumption to be obtained by the predetermined vehicle when traveling following the candidate vehicle; and
    an emphasis display setting unit that performs setting for performing emphasis display of the candidate vehicle for which the reduction effect has been calculated, and sets a degree of emphasis of the emphasis display to be higher for a vehicle with which the reduction effect is large than for a vehicle with which the reduction effect is small, wherein
    when the display control is executed, the emphasis display of the candidate vehicle is performed according to the degree of emphasis set by the emphasis display setting unit.

2. The control device according to claim 1, wherein
    the detection unit detects a plurality of the candidate vehicles, and
    the calculation unit calculates the reduction effect for each of the candidate vehicles, and
    the emphasis display setting unit
    sets the degree of emphasis to be higher for a vehicle with which the reduction effect is large among the plurality of the candidate vehicles than for a vehicle with which the reduction effect is small, and
    performs, when the display control is executed, the emphasis display of both the vehicle with which the reduction effect is large and the vehicle with which the reduction effect is small according to the degree of emphasis set by the emphasis display setting unit.

3. The control device according to claim 1, wherein
    the calculation unit calculates, as the reduction effect of the energy consumption, a reduction effect of air resistance to be obtained by the predetermined vehicle when traveling following the candidate vehicle, and the emphasis display setting unit sets the degree of emphasis to be higher for a vehicle with which the reduction effect of the air resistance is large than for a vehicle with which the reduction effect of the air resistance is small.

4. A vehicle comprising the control device according to claim 1, the vehicle comprising:
- a detection unit that detects a candidate vehicle that is a candidate for a following target of the predetermined vehicle from among a plurality of the preceding vehicles;
- a calculation unit that calculates, for the candidate vehicle detected, a reduction effect of energy consumption to be obtained by the predetermined vehicle when traveling following the candidate vehicle; and
- an emphasis display setting unit that performs setting for performing emphasis display of the candidate vehicle for which the reduction effect has been calculated, and sets a degree of emphasis of the emphasis display to be higher for a vehicle with which the reduction effect is large than for a vehicle with which the reduction effect is small, wherein
- when the control device executes the display control, the emphasis display of the candidate vehicle is performed according to the degree of emphasis set by the emphasis display setting unit.

5. The vehicle according to claim 4, wherein
the detection unit detects a plurality of the candidate vehicles, and
the calculation unit calculates the reduction effect for each of the candidate vehicles, and
the emphasis display setting unit
sets the degree of emphasis to be higher for a vehicle with which the reduction effect is large among the plurality of candidate vehicles than for a vehicle with which the reduction effect is small, and
when the control device executes the display control, the control device performs the emphasis display of both the vehicle with which the reduction effect is large and the vehicle with which the reduction effect is small according to the degree of emphasis set by the emphasis display setting unit.

6. The vehicle according to claim 4, wherein
the calculation unit calculates, as the reduction effect of the energy consumption, a reduction effect of air resistance to be obtained by the predetermined vehicle when traveling following the candidate vehicle, and
the emphasis display setting unit sets the degree of emphasis to be higher for a vehicle with which the reduction effect of the air resistance is large than for a vehicle with which the reduction effect of the air resistance is small.

7. A mobile terminal communicably connected to the vehicle according to claim 4, the mobile terminal comprising:
- a communication unit that receives image data of emphasis display transmitted from the vehicle; and
- a display unit that performs the emphasis display of the candidate vehicle in accordance with the image data of emphasis display received from the vehicle.

8. A display device that performs emphasis display of a preceding vehicle traveling in front of a predetermined vehicle, the display device comprising:
- a detection unit that detects a candidate vehicle that is a candidate for a following target of the predetermined vehicle from among a plurality of the preceding vehicles;
- a calculation unit that calculates, for the candidate vehicle detected, a reduction effect of energy consumption to be obtained by the predetermined vehicle when following the candidate vehicle;
- an emphasis display setting unit that performs setting for performing emphasis display of the candidate vehicle for which the reduction effect has been calculated, and sets a degree of emphasis of the emphasis display to be higher for a vehicle with which the reduction effect is large than for a vehicle with which the reduction effect is small; and
- a display unit that performs the emphasis display of the candidate vehicle according to the degree of emphasis set by the emphasis display setting unit.

9. The display device according to claim 8, wherein
the detection unit detects a plurality of the candidate vehicles, and
the calculation unit calculates the reduction effect for each of the candidate vehicles, and
the emphasis display setting unit
sets the degree of emphasis to be higher for a vehicle with which the reduction effect is large among the plurality of candidate vehicles than for a vehicle with which the reduction effect is small, and
the display unit performs the emphasis display of both the vehicle with which the reduction effect is large and the vehicle with which the reduction effect is small according to the degree of emphasis set by the emphasis display setting unit.

10. The display device according to claim 8, wherein
the calculation unit calculates, as the reduction effect of the energy consumption, a reduction effect of air resistance to be obtained by the predetermined vehicle when traveling following the candidate vehicle, and
the emphasis display setting unit sets the degree of emphasis to be higher for a vehicle with which the reduction effect of the air resistance is large than for a vehicle with which the reduction effect of the air resistance is small.

* * * * *